April 19, 1966  R. G. MORRICE  3,246,722
ROTATABLE SERVING LINE TRAY FOR CAFETERIAS
Filed Sept. 30, 1963  2 Sheets-Sheet 1
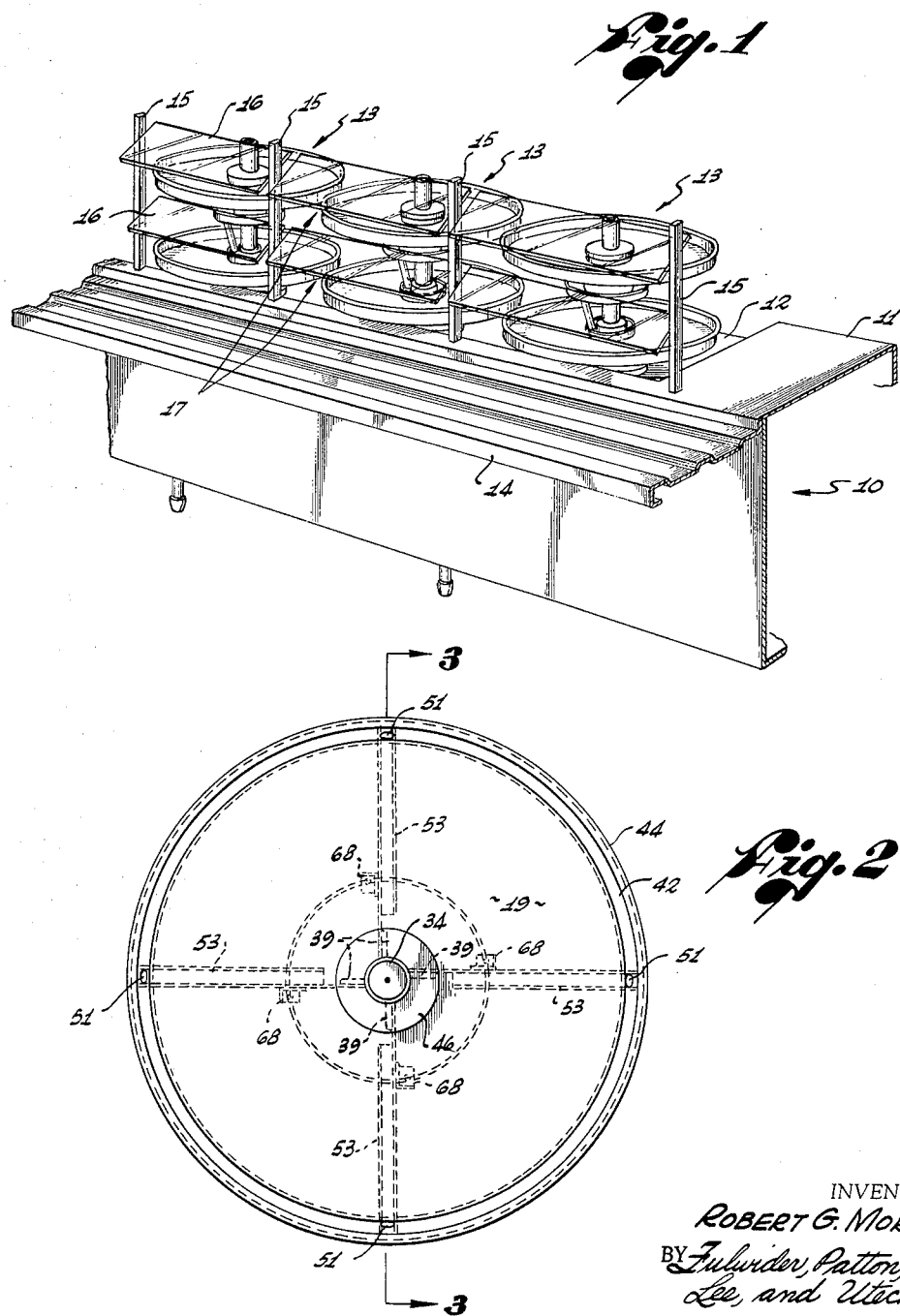
INVENTOR.
ROBERT G. MORRICE
BY Fulwider, Patton, Rieber,
Lee, and Utecht
ATTORNEYS

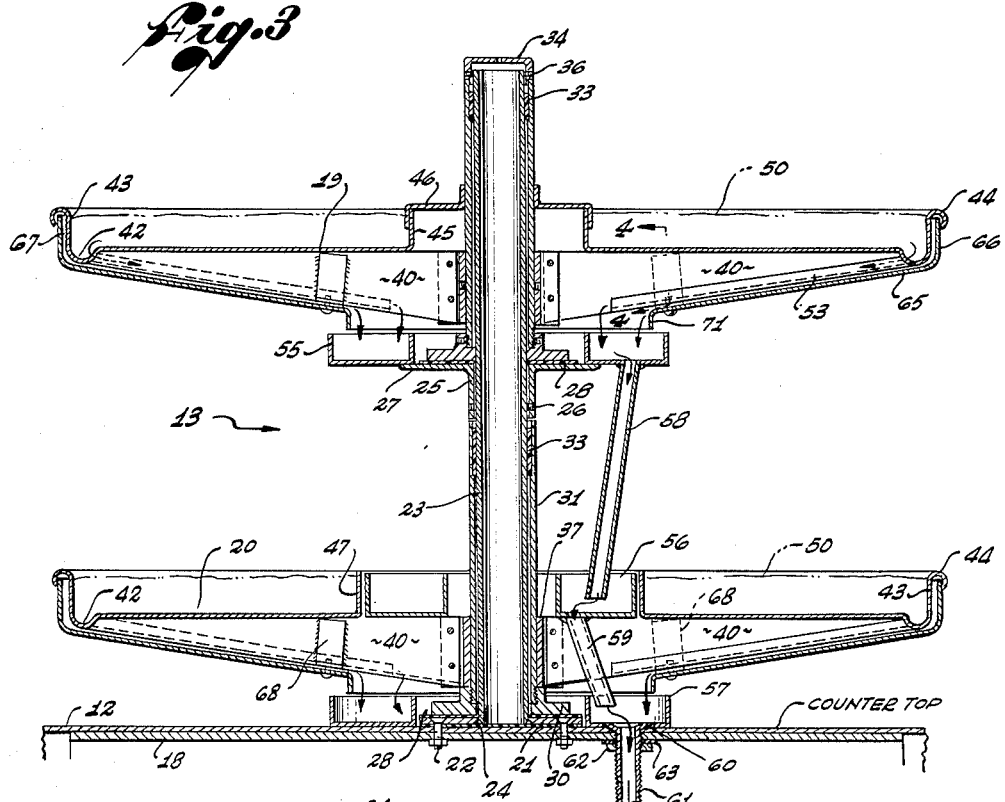
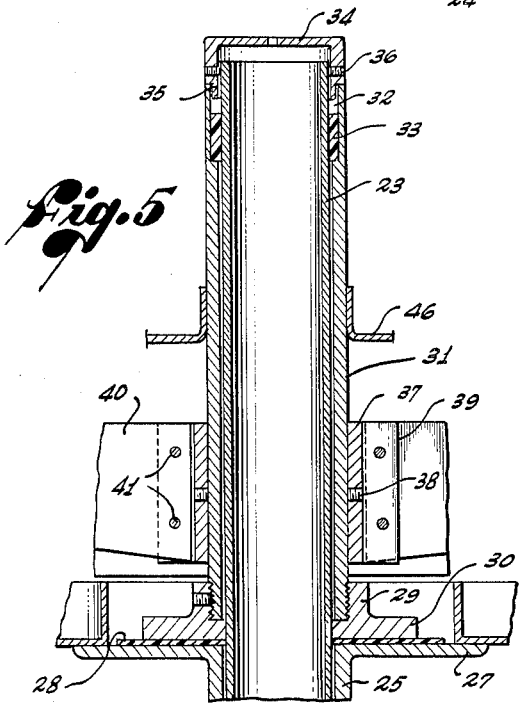
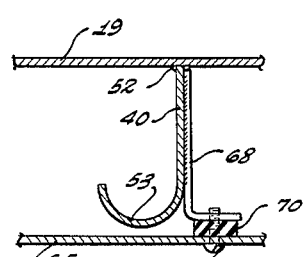

United States Patent Office 3,246,722
Patented Apr. 19, 1966

3,246,722
ROTATABLE SERVING LINE TRAY
FOR CAFETERIAS
Robert G. Morrice, 5320 Santa Fe Ave.,
Los Angeles, Calif.
Filed Sept. 30, 1963, Ser. No. 312,551
9 Claims. (Cl. 186—1)

The present invention relates generally to cafeteria serving lines and, more particularly, to an improved serving line incorporating rotatable serving trays.

As is well known, cafeteria serving lines commonly have sections devoted to the display of chilled foods to which the customer may help himself. Usually, health regulations require protective devices, called "sneeze guards," to be mounted along the line in position to protect the food on display from customers suspiration and the like. These sneeze guards must be arranged to allow a sufficiently large gap through which the customer can reach to take a dish which may be on the far side of the ice table. Accordingly, the sneeze guards are relatively ineffectual because they must be of small size or spread far apart to leave a sufficiently large gap. Thus the food on display is not very well protected against the customers breathing and the customer may reach across it and come into contact with it in order to obtain an article that he wants on the far side of the table.

An object of my invention is to provide an improved cafeteria serving line incorporating rotatably mounted serving trays by means of which the sneeze guards may be adapted to more efficiently protect the food on display.

A further object of the invention is to provide a cafeteria serving device utilizing a plurality of rotatably mounted trays whereby to more efficiently utilize the available counter space.

Yet another object of the invention is to provide a multi-tiered cafeteria serving tray that is particularly adapted for the display of chilled foods, in that the foods are protected against contact with condensation moisture and the runoff of the melting ice.

A further object of the invention is to provide a rotatable cafeteria serving tray for the display of chilled foods which incorporates an efficient condensation shield whereby to prevent the condensation moisture from an elevated tray from being deposited on food displayed below.

It is also an object of the invention to provide a rotatable cafeteria serving tray for the display of chilled foods having an improved bearing means which will be reliable in operation over a long period of time despite the presence of moisture on the bearings.

The invention also has for an object improved rotating ice tray servers in which foods are kept cool and fresh with less labor, in a more sanitary fashion, and with more appeal to the customer.

The foregoing and other objects and advantages of my invention will be apparent from the following description of a presently preferred embodiment thereof, which is set forth by way of example, when taken in conjunction with the annexed drawings.

FIGURE 1 is a perspective view of a cafeteria serving line adapted for the display of chilled foods and incorporating my invention;

FIGURE 2 is a top plan view of one of the serving trays shown in FIGURE 1;

FIGURE 3 is a vertical sectional view taken along the line 3—3 of FIGURE 2;

FIGURE 4 is a vertical sectional view taken on the line 4—4 of FIGURE 3 and showing a presently preferred means of suspending the condensation shield;

FIGURE 5 is an axial sectional view of the bearing for the upper one of the trays shown in FIGURE 3, on a slightly larger scale.

While the invention may be utilized for the display and service of unchilled foods, it has special utility for chilled foods. Accordingly, in FIGURE 1, there is represented a chilled food section of a cafeteria serving line 10. This serving line comprises a counter 11 having a recessed counter top 12 on top of which several rotatable tray assemblies 13 are mounted. On the customer side of the counter 11, an elongated shelf 14 is secured on which the customers trays are slid. A plurality of posts 15 are rigidly secured along that side of the counter 11 to which the shelf 14 is affixed, and these posts support a plurality of sneeze guards 16 to protect the displayed food against sneezing, coughing, breathing or inadvertent contact by the customer. However, there are gaps 17 between vertically adjacent sneeze guards 16, and between the countertop and the sneeze guard thereabove, through which the customer may reach to turn the trays 13 to bring a desired food into easy reach. At the same time, however, the gap 17 may be held to a minimum just sufficient to allow rotation of the service trays and removal of foods only from that portion of the periphery of each tray immediately adjacent the gap whereby the protection afforded by the sneeze guards 16 is maximized. Each tray assembly 13 is provided with a means to carry off water produced by the melting of the ice in such a fashion that the runoff water does not come into contact with any of the displayed foods. The tray assemblies are further provided with condensation shields, at least for uppermost trays, whereby condensation moisture is also prevented from contacting the displayed foods.

More specifically, the countertop 12 is customarily reinforced by a plurality of braces, such as the channel 18 shown in FIGURE 3, and is therefore well adapted to provide a firm support for the tray assembly 13. While the tray assembly may be secured on top of the counter by a variety of means, it may also be portable and it will also be understood that the assembly may comprise a plurality of rotatable trays or merely one.

By way of example, the illustrated tray assembly 13 includes a pair of trays 19 and 20 and the whole assembly is supported on a base plate 21 that is secured to the countertop 12 by means of countersunk head nut and bolt assemblies 22. In its center, the base plate 21 is provided with a coaxial vertically elongated standard or center post 23, which may be a length of pipe secured at its lower end to the base plate by welding 24, or other appropriate means.

As the bearing means for both trays 19 and 20 are substantially the same, but one of them will be described in detail.

Referring to FIGURE 5, which shows a support for the upper tray 19, there is a support member 25 comprising a sleeve-like body that is secured coaxially on the standard 23 by means of set screws 26 and formed at its upper end with a radially disposed flange 27. An annular gasket 28 is coaxially seated on the upper surface of the flange 27. Preferably, this gasket is made of polyethylene, as I have found this material to have desirable characteristics for use as a thrust bearing in the environment of the serving tray. Thus, the polyethylene, when dry, nevertheless will allow the tray to rotate with sufficient freedom. On the other hand, when the polyethylene is moist, as it tends to be, the tray is nicely lubricated to spin freely but yet not with sufficient speed to throw the foods and moisture off the tray. I have also found that this material is more durable than conventional steel thrust bearings as the latter tends to corrode, as the moisture penetrates thereinto, ultimately resulting in interference with rotation of the tray, although stainless steel may be used. Other materials may be employed for the thrust bearing, for example, Teflon, a polytetrafluorethylene product of Du Pont Chemical Corporation, Bakelite, hard and dense rubber, hardwood or Masonite may be employed.

Resting on top of the gasket 28 and coaxially journaled on this standard 23 is a collar member 29, formed at its lower end with a radially disposed flange 30 whose lower surface constitutes the thrust bearing area of the collar. At its upper end, the collar 29 is interiorly tapped for threadedly receiving the lower end of an elongated sleeve 31. This sleeve has a substantially larger inner diameter than the outer diameter of the standard 23 so as to provide ample clearance therebetween. At its upper end, the sleeve 31 is formed with a counterbore 32 that receives a generally cylindrical bearing ring 33 in the annulus between the interior of the counterbore and the outer diameter of the standard 23 and serves as a plain bearing support for that end of the elongated sleeve 31. The standard 23 is surmounted by a cap 34 formed at its lower end with a cylindrical flange 35 that is telescopically receivable in a sliding fit within the counterbore 32. A plurality of set screws 36 are employed to secure the cap 34 in place on the upper end of the standard 23.

In order to position the revolvable trays at the proper level for easy access through the gaps 17 of the serving counter, it is desirable to have them mounted on the standard 23 for vertical adjustment. This is accomplished by means of a cylindrical member 37 adapted for a sliding fit on the elongated sleeve 31. As is shown in FIGURE 5, the member 37 is provided with a plurality of set screws 38 which can be loosened and tightened for adjustment of the member 37 to a desired level on the sleeve 31. The member 37 is formed with a plurality of radially extending flanges 39, each of which flanges is secured to the radially innermost end of a rib 40 comprising a part of the tray 19 or 20, as the case may be. This attachment of the member 37 and ribs 40 may be by means of rivets 41 or other suitable fastener means.

As will be apparent from an examination of FIGURE 3, the support for the lower tray 20 is substantially like the support for the upper tray 19, just described, the primary difference being that the base plate 21 supports the gasket 28, there being no support member 25 for the lower tray.

The trays 19 and 20 are substantially the same in overall configuration, both being adapted to contain ice and being provided with means for draining off water as the ice melts. Thus, both trays at their outer peripheries are formed with an annular groove 42 that is completely encircled by an upstanding wall portion 43 and this wall at its upper edge is developed into a reversely rolled rim portion 44. The inner periphery of the upper tray 19 is formed with an upstanding wall 45 and the annular area between this inner wall and the thinner post structure is covered by an annular cap 46. The inner periphery of the lower tray 20 is formed into an upstanding wall 47 and the annular area between this inner wall and the supporting structure is occupied by one of the troughs of the drainage system to be described later.

As is shown in FIGURE 3, the trays 19 and 20 are thus adapted to contain ice 50 on which plates of foods are displayed. As the ice melts, the resulting water flows into the annular grooves 43 which, as best seen in FIGURE 2, are each provided with a plurality of drain holes 51. As is shown in FIGURE 4, the ribs 40 are rigidly secured, as by welding 52, to the underside of the trays all along a straight horizontal upper edge of the rib 40. As is shown in FIGURE 3, each rib is generally triangular in elevation and has an integrally formed gutter 53 along its lower edge. This gutter, at its radially outer end has communication with the drain holes 51 of the tray whereby the water is conducted radially inwardly and downwardly along the gutter 53 to fall into a drainage trough.

For the double tiered or double tray assembly 13, the drainage system comprises an upper trough 55, an intermediate trough 56 and a lower trough 57, all of which are circular in plan view and channel shaped in radial cross-section. The upper trough 55 rests on the outer peripheral portion of the flange 27 of the support member 25 and has its annular opening disposed to receive water dropping from the radially inner ends of the gutters 53 of the tray 19. On one side, the trough 55 in its floor is provided with a drain pipe 58 whose lower end extends into and between the walls of the intermediate trough 56 and may be cut to length in accordance with the adjustment of the trays. This intermediate trough rests on top of the upper edges of the ribs 40 of the lower tray 20 in the annulus between the inner wall 47 of the tray and the supporting structure and the trough turns along with the tray 20. The intermediate trough 56 is, in turn, provided with a downwardly extending drainpipe 57 whose lower end extends into the bottom trough 57. The bottom trough is, in turn, provided with a drain outlet 60 which may be provided with any suitable conduit means. In this case of a relatively permanent installation, the lower trough 57 rests on top of the counter top 12 and communicates with a drain stub 61, the upper flared end of the stub being held in place by means of a lock nut 62 over a washer 63 whereby the trough is clamped between the flared end of the drain stub and the lock nut.

From the foregoing, it will be seen that a sufficient drainage means is provided for conducting the water resulting from the melting of the ice from both trays 19 and 20, continuously, thus preserving the fresh appearance of the ice remaining in the trays. The upper trough 55 is stationary but receives water flowing from the gutters 53 thereabove in all rotational positions of the tray 19. In similar fashion, the intermediate trough 56 receives the effluent from the drain pipe 58 in all rotational positions of the intermediate trough and lower tray 20 relative to the drain pipe 58. In like fashion, the stationary lower trough 57 receives the effluent from above through the drainpipe 59 in all rotational positions of the drain-pipe and lower tray 20 relative to the lower trough.

When the trays 19 and 20 are chilled by the ice, condensate will form on the undersides thereof and on the ribs 40. Since it is undesirable to have such condensate thrown off as a result of the spinning of the tray, or for the condensate of the upper tray to fall on the foods displayed on the tray below, I have provided a condensate shield 65, which should be employed on at least the uppermost tray.

The shield 65 is of inverted generally frusto-conical configuration and is formed at its outer periphery into a cylindrical flange 66. This flange is of a diameter to define an annular space 67 with the outer wall of the tray 19, the upper edge of the flange 66 being adapted for snapping under the reversely rolled rim of the ice tray wall. The frusto-conical body portion of the shield 65 is supported in spaced relation beneath the gutters 53 of the ribs 40 as shown in FIGURE 4, by means of a plurality of brackets 68 adapted to receive machine screws 69 or the like in a flange at the lower end of the bracket. An insulator 70 of rubber or other thermal insulating material is interposed between the bracket 68 and the shield 65 to minimize chilling of the shield by conduction from the bracket. As is shown in FIGURE 3, the radially inner edge of the shield 65 is formed with a downwardly directed flange 71 directed towards the trough just thereunder. Accordingly, the condensate which drops onto the upper surface of the shield 65 flows radially inwardly of the shield and over the flange 71 and into the trough to be carried off by the drainage system previously described.

It will be seen that the assembly may very readily be disassembled for purposes of maintenance or cleaning. Thus, once the cap 34 has been removed and the set screws 38 loosened, the upper tray assembly may be slid upwardly off of the supporting standard 23. The upper trough 55 may then be lifted off the supporting flange 27 after which the support member 25 may be removed after the set screws 26 have been loosened. The intermediate trough 56 can then be lifted and the lower tray assembly removed after the set screws 26 of its hub have been loosened. The condensate shield 65 can be removed merely by removal of the screws 69. Thus, all parts of the serving device are readily accessible for periodic cleaning thereof and for replacement of the gaskets 28 or bearings 33.

While in the foregoing specification I have set forth a specific structure in considerable detail for the purpose of illustrating one embodiment of the invention, it will be understood that such details of structure may be varied widely by those skilled in the art without departing from the spirit of my invention.

I claim:

1. In a cafeteria serving device for displaying chilled foods, the combination comprising:
    a counter provided with an outlet for draining off water;
    a serving tray mounted on top of said counter for rotation about a vertical axis for movement of all peripheral portions of said tray past a serving side of said counter, said tray having a configuration adapted to contain ice;
    a drain means formed integrally with said tray and adapted to drain water out of said tray as the ice melts to conduct said water to and drop it from within an annular area coaxially adjacent the center of said tray;
    and an annular trough coaxially positioned beneath both said tray and said annular area and over said counter and having communication with said drain outlet of said counter, said tray and said trough being adapted to drain water from said tray through said drain means and into said trough in all positions of rotation of said tray.

2. In a cafeteria serving device for displaying chilled foods, the combination comprising:
    a vertically disposed support;
    a pair of horizontally disposed serving trays mounted on said support in vertically spaced superposed relationship, each of said trays being rotatably mounted on said support for movement of all peripheral portions thereof past a serving side of said device and each of said trays having a configuration adapted to contain ice and also having a drainage means to drain water out of said tray;
    a pair of annular troughs each of which is coaxially positioned beneath one of said drainage means, each of said troughs being provided with a drain;
    a third annular trough coaxially interposed between said pair of troughs and having a drain into the lowest of said troughs, the uppermost of said troughs having a drain into said third trough;
    and a condensate shield mounted coaxially beneath the upper one of said trays and adapted and arranged to receive substantially all condensate forming on the lower surface of said upper tray and to drain said condensate into the upper one of said troughs.

3. In a cafeteria serving device for displaying foods, the combination comprising:
    a vertically extending standard rigidly mounted on said device;
    a pair of horizontally disposed bearing support members coaxially secured to said standard in vertically spaced apart relationship;
    a pair of sleeve members coaxially rotatably mounted on said standard and each having thrust bearing means at a lower end in contact with the upper surface of one of said bearing support members;
    a pair of tray support members each of which is adjustably secured to one of said sleeve members for rotation with said sleeve member and adjustment vertically relative to said sleeve member;
    and a pair of serving trays of annular plan configuration, each of said trays being coaxially secured to one of said pair of tray support members for rotation and vertical adjustment with said tray support member whereby any peripheral portion of said trays can be passed adjacent a serving side of said device at a desired level of said trays relative to sneeze guards mounted on said device.

4. A serving device as set forth in claim 3 in which each of said bearing support members on its upper surface and each of said sleeve members at its lower end has an annular bearing area, and a water lubricated bearing means is interposed between said bearing areas of adjacent ends of each of said bearing support members and the corresponding one of said sleeve members.

5. A serving device as in claim 4 in which said bearing means comprises an annular disc of polyethylene and said bearing areas comprise flanges on said bearing support members on said sleeve members.

6. A cafeteria serving tray for displaying chilled foods, comprising:
    a vertical support member;
    a serving tray of annular configuration coaxially and rotatably mounted on said support member, said tray being formed on its outer periphery with an annular groove adapted to receive water from ice melting in said tray, said groove being encircled by an upstanding wall formed integrally in the outer periphery of said tray;
    a plurality of gutters on the underside of said tray, each of which gutters extends generally radially of said tray from a raised outer end to a lower inner end and has fluid communication at said outer end with said groove formed in the outer periphery of said tray;
    an annular condensate shield of generally inverted frusto-conical configuration supported coaxially with said tray beneath said gutters and spaced from said gutters and tray, said shield being adapted to catch substantially all condensate dripping from the underside of said tray to conduct said condensate inwardly to the inner periphery of said shield;
    and an annular trough supported coaxially in said support member beneath said shield and adapted and arranged to catch condensate falling from the inner periphery of said shield and to catch water falling from radially inner ends of said gutters.

7. A serving tray as set forth in claim 6 in which said upstanding wall on the outer periphery of said tray has an outwardly extending rim on its upper edge and said condensate shield is formed on its outer periphery with an upstanding wall encircling and spaced radially outwardly from said wall of said tray and overhung by said rim of said tray, and in which said shield is suspended from said tray in spaced relation to said tray by a plurality of insulated brackets, each of which brackets is connected at an upper end to one of said gutters and at a lower end to said shield, there being an insulator interposed between said shield and said bracket adapted to reduce conduction between said bracket and said shield whereby to avoid chilling of said shield by conduction from said tray.

8. In a cafeteria serving device for displaying chilled foods, the combination comprising:
    a vertically extending standard rigidly mounted on said device;
    a pair of horizontally disposed bearing support members coaxially secured to said standard in vertically spaced apart relationship;

a pair of sleeve members coaxially rotatably mounted on said standard and each having thrust bearing means at a lower end in contact with the upper surface of one of said bearing support members;

a pair of tray support members each of which is adjustably secured to one of said sleeve members for rotation with said sleeve member and adjustment vertically relative to said sleeve member;

a pair of serving trays of annular plan configuration, each of said trays being coaxially secured to one of said pair of tray support members for rotation and vertical adjustment with said tray support member whereby any peripheral portion of said trays can be passed adjacent a serving side of said device at a desired level of said trays relative to sneeze guard mounted on said device, each of said trays being formed on its outer periphery with an annular groove adapted to receive water from ice melting in said tray, said groove being encircled by an upstanding wall formed integrally in the outer periphery of said tray;

a plurality of gutters on the underside of each of said trays, each of which gutters extends radially of said tray from a raised outer end to a lower inner end and has fluid communication at said outer end with said groove formed in the outer periphery of said tray;

and an annular condensate shield of generally inverted frusto-conical configuration supported coaxially with the upper one of said trays beneath said gutters and spaced from said gutters and tray; said shield being adapted to catch substantially all condensate dripping from the underside of said upper tray to conduct said condensate radially inwardly to the inner periphery of said shield.

9. A serving device as set forth in claim 8 in which an annular trough is coaxially positioned beneath each of said pair of trays, the upper one of said troughs being adapted and arranged to catch condensate falling from the inner periphery of said shield and to catch water falling from radially inner ends of said gutters, and in which a third annular trough is coaxially interposed between said pair of troughs and is rotatable with the lower one of said pair of trays, the uppermost of said troughs having a downwardly extending drain pipe emptying into said third annular trough, said third trough also having a drainpipe depending therefrom and emptying into the lowermost of said annular troughs, said lowermost trough being provided with a drain outlet.

References Cited by the Examiner

UNITED STATES PATENTS

| | | | |
|---|---|---|---|
| 693,497 | 2/1902 | Childers | 108—24 |
| 2,470,749 | 5/1949 | Randall | 108—105 |
| 2,632,568 | 3/1953 | Abt | 312—229 |
| 2,894,604 | 7/1959 | McMillan | 186—1 |
| 2,971,656 | 2/1961 | Shoffner | 108—24 |

SAMUEL F. COLEMAN, *Primary Examiner.*

ANDRES H. NIELSEN, *Examiner.*